Sept. 10, 1946.  F. W. CALDWELL  2,407,223

ENGINE COOLING AND CHARGING APPARATUS

Filed Jan. 9, 1945

INVENTOR.
FRANK W. CALDWELL
BY
John C. Kerr
ATTORNEY

Patented Sept. 10, 1946

2,407,223

UNITED STATES PATENT OFFICE 2,407,223

ENGINE COOLING AND CHARGING APPARATUS

Frank W. Caldwell, West Hartford, Conn., assignor to United Aircraft Corporation, East Hartford, Conn., a corporation of Delaware Application January 9, 1945, Serial No. 572,077

2 Claims. (Cl. 123—171)

This invention relates to aircraft, and, more particularly, to an arrangement for supplying air for combustion and for cooling the engine. It is one of the principal objects of this invention to provide a fan and duct assembly which performs both of these functions simultaneously.

It is a further object of this invention to provide a fan capable of delivering air streams of different pressures for performing different functions. More particularly, there is provided a fan capable of delivering several annular air streams under different pressures for cooling the engine and providing combustion air. The pressure employed for the latter purpose may be utilized for supercharging.

In the above arrangement, the air stream delivered at higher pressure would have a higher temperature than the air delivered at lower pressure. It is therefore a further object of this invention to provide, in connection with the above described fan which delivers a plurality of air streams at different pressures, means whereby a cooler air stream may be employed to cool the air stream of higher pressure and higher temperature.

Still another object of this invention is the provision of a fan which delivers a plurality of air streams at different pressures, the air streams near the periphery of the fan being of greater pressure than those nearer the axis of rotation, in combination with a duct cooperating with the air stream of greater pressure, said duct leading to the air inlet of the engine or carburetor for charging and supercharging.

Further objects and advantages of this invention will become apparent in the following detailed description thereof.

Figure 1:
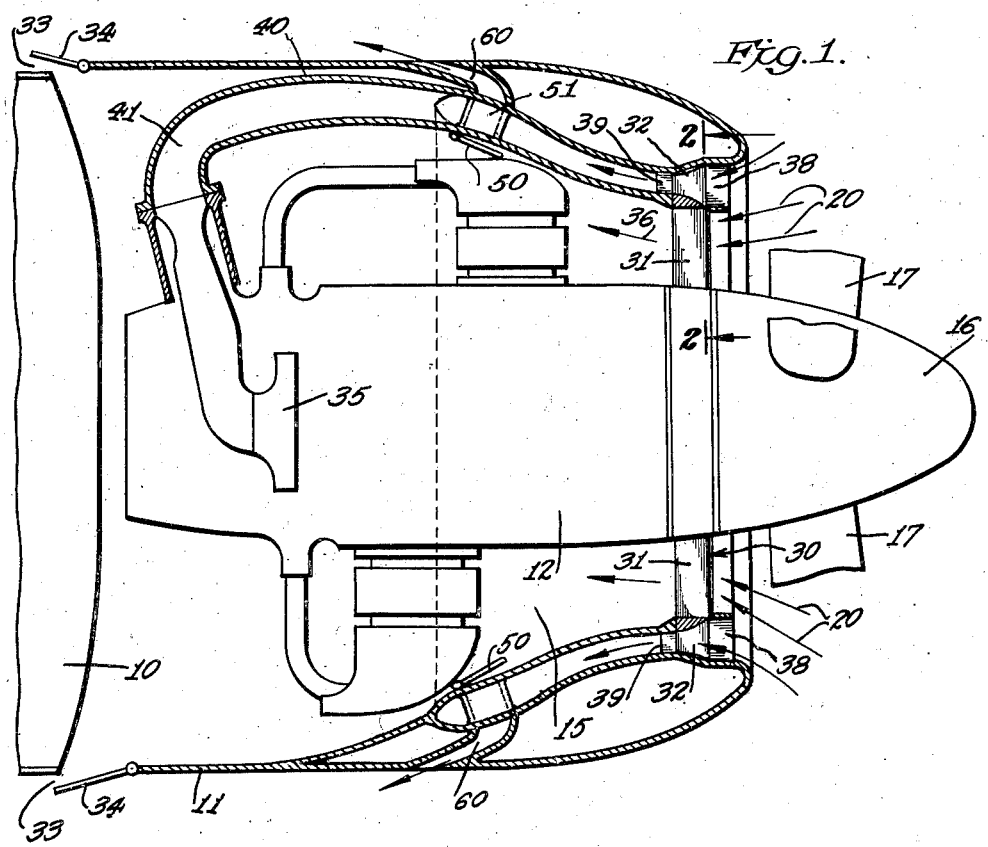
Figure 2:
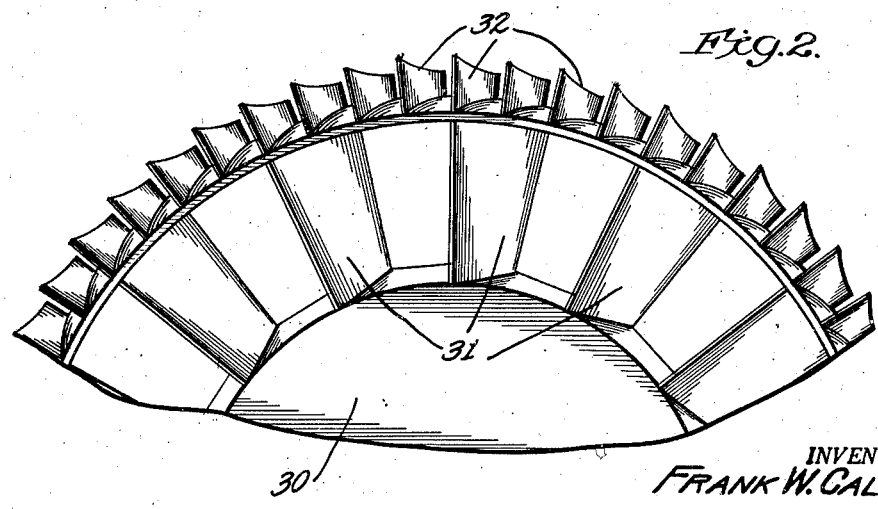

In the accompanying drawing:

Figure 1 is a vertical section through an airplane engine cowl, disclosing my invention applied to the aircraft; and Fig. 2 is a vertical section through a portion of the fan, taken substantially on the line 2—2 of Fig. 1.

Referring to the drawing, there is disclosed the forward portion of a fuselage 10 upon which is mounted an engine cowl 11 spaced from the engine 12 to form a cooling passage 15. The engine carries at its forward end the spinner 16 which supports the propeller blades 17. The cooling passage 15 is open at its forward end so that the travel of the airplane will cause air to enter the cooling passage, as indicated by the arrows 20, and pass over the engine to cool the same. The amount of cooling air thus supplied by the travel of the airplane may not be sufficient to cool the engine and there is therefore provided a cooling fan 30 positioned between the engine and the propeller and driven from the engine shaft either at propeller speed or, through multiplying gearing, at higher than propeller speed. The air supplied by fan 30 thus supplements the air provided by the movement of the airplane.

Heretofore, the fan 30 has been a fan of ordinary design intended to deliver air into the cowl in the conventional manner. In the present case, however, I have devised a design of fan capable of performing several functions simultaneously, one of these functions being the ordinary function of supplying additional cooling air to the engine cowl. The other function may be the important and highly desirable one of supplying combustion air to the engine and particularly, supplying supercharging air. For this purpose, instead of forming the fan so as to have conventional blades extending from near the axis of rotation to the periphery, I form the fan with a plurality of sets of annular blades. Two such sets 31 and 32 are shown by way of example. The inner set of blades 31 is designed to deliver an annular stream of air at relatively low pressure to the interior of the cowl. This air, indicated by arrow 36, will pass over the engine to cool it and will then discharge through the usual exit passages 33 controlled by pivoted adjustable flaps 34 in a well known manner.

The outer set of blades 32 is designed to deliver air at relatively high pressure, and means are provided for delivering this high pressure air to the engine for combustion purposes. The pressure may be sufficiently high so that blades 32 act as an auxiliary supercharger stage for the centrifugal main stage supercharger 35. For this purpose, an annular duct 40 carried by the cowl is positioned with its open end adjacent the annular set of blades 32 so that said blades discharge the relatively high pressure annular stream into the duct. Stationary vanes 38 and 39 may be provided adjacent the entering and leaving sides of the blades 32. The duct diverges from the blades 32 toward the rear and is finally gathered aft of the annular intercooler 51 into a single duct 41 discharging into the supercharger 35. If desired, supercharger 35 may be omitted, in which case duct 41 discharges directly into the engine intake pipes.

While I have illustrated one form of fan embodying my invention as applied to the simultaneous cooling of the engine and supplying combustion air under pressure, it will be understood that the basic principle has more general application and that the plurality of air streams under different pressures supplied by a single fan may be utilized for other purposes.

The radial dimensions of the various sets of blades will depend upon the functions which they are to perform. In the case described, the inner set of blades 31 will occupy approximately two-thirds of the radial distance while the outer set will occupy the remaining one-third. The blades and passages of the outer portion may be designed to operate efficiently at high pressures while the inner portion is designed for low pressures.

Since the higher pressure air will be delivered at correspondingly highter temperature, I may provide means whereby the relatively cooler low pressure air is caused to cool the higher pressure air. For this purpose a scoop 50 may be provided adjacent the inner diameter of the annular passage 40 to deliver the cooler air to the intercooler or heat exchanger 51 in the passage 40. The high pressure air will pass over the intercooler on its way through the passage 40. The scoop may be in the form of a plurality of pivoted blades adjustable by well known means. The cooling air gathered by the scoop may be discharged through the intercooler to passages or ducts 60 venting to the outside of the cowl at a point where good suction may be obtained.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and other omitted without interfering with the more general results outlined, and the invention extends to such use.

Having described my invention, what I claim and desire to secure by Letters Patent is:

1. In an aircraft having an engine, a fan driven from said engine, said fan having a plurality of concentric rows of blades, the blades being so formed that a plurality of concentric air streams substantially parallel to the axis of rotation of the fan are produced, means for delivering the inner and outer air streams directly to the engine for cooling its surface and for combustion, the means for delivering the outer air stream including a conduit, a hollow intercooler positioned within the conduit, and means for diverting a portion of the inner air stream and passing it through the intercooler.

2. In an aircraft having an engine, a fan driven from said engine, said fan having a plurality of concentric rows of blades, the blades being so formed that a plurality of concentric air streams substantially parallel to the axis of rotation of the fan are produced, means for delivering the inner and outer air streams directly to the engine for cooling its surface and for combustion, the means for delivering the outer air stream including a conduit, a hollow intercooler positioned within the conduit, and means for diverting a portion of the inner air stream and passing it through the intercooler, said last-named means including a scoop carried by the conduit and extending into the inner air stream.

FRANK W. CALDWELL.